United States Patent [19]

Ito et al.

[11] Patent Number: 5,597,409
[45] Date of Patent: Jan. 28, 1997

[54] BITUMINOUS REINFORCING MATERIAL FOR GROUTING

[75] Inventors: Akira Ito; Hiroyuki Ishii, both of Tochigi, Japan

[73] Assignee: Nichireki Company, Limited, Tokyo, Japan

[21] Appl. No.: 506,108

[22] Filed: Jul. 24, 1995

[51] Int. Cl.$^6$ .............................. C04B 24/36; C08L 95/00
[52] U.S. Cl. .......................... 106/671; 106/669; 106/670; 106/277; 523/130; 524/59; 524/60; 524/705
[58] Field of Search .................... 106/670, 671, 106/668, 277, 669, DIG. 7; 523/130; 524/59, 60, 705

[56] References Cited

U.S. PATENT DOCUMENTS

| | | | |
|---|---|---|---|
| 3,977,889 | 8/1976 | Shearing | 106/671 |
| 4,084,981 | 4/1979 | Higuchi et al. | 106/671 |
| 4,174,230 | 11/1979 | Hashimoto et al. | 106/270 |
| 4,209,337 | 6/1980 | Wagner et al. | 106/671 |
| 4,743,304 | 5/1988 | Gilmore et al. | 106/671 |
| 5,091,008 | 2/1992 | Lehmann et al. | 106/671 |

FOREIGN PATENT DOCUMENTS

| | | | |
|---|---|---|---|
| 0015236 | 9/1980 | European Pat. Off. | |
| 0535282 | 4/1993 | European Pat. Off. | |
| 2734360 | 2/1978 | Germany | 106/671 |
| 47-30607 | 8/1972 | Japan | 106/671 |
| 49-121825 | 11/1974 | Japan | 106/671 |
| 60-251160 | 12/1985 | Japan | 106/670 |

*Primary Examiner*—Anthony Green
*Attorney, Agent, or Firm*—Browdy and Neimark

[57] ABSTRACT

The invention relates to a reinforcing material suitable for repairing cavities in the ground surrounding an underdrain through which sewers are laid down, and provides a bituminous reinforcing material for grouting excellent in workability and durability. The two-liquid bituminous reinforcing material comprises a liquid A that is obtained by mixing together an asphalt emulsion, a hydraulic inorganic material, a reactive type of water-soluble resin, and water, and a liquid B that is obtained by mixing together an asphalt emulsion, a hydraulic inorganic material, a polymerization catalyst, and water.

9 Claims, 6 Drawing Sheets

BITUMINOUS REINFORCING MATERIAL FOR GROUTING

BACKGROUND OF THE INVENTION

The present invention relates to a bituminous reinforcing material for grouting. More specifically, the present invention relates to an asphalt emulsion type material reinforced cement and resin for grouting. The asphalt emulsion type material according to the present invention is suitable for repairing cavities in the ground surrounding an underdrain through which sewers are laid down, and is excellent in workability and durability.

PRIOR ART

An underground sewer system is designed to carry off drainage water and sewage to waste disposal plants or places from where they are discharged, and is built up of an underdrain, manholes, rainwater discharge ports, discharge ports, connector pipes, etc. However, a substantial portion of the sewer system is the underdrain. These parts are essential for the sewer system, and should be maintained and controlled so that they can constantly be in good operation.

However, severe problems often occur, inclusive of seepage of water through junctions, junctures, connectors and the like of the underdrain, depression of ground or traffic accidents due to failure of the underdrain, and contamination of underground water due to failure of the underdrain.

In recent years, the formation of cavities in the ground surrounding the underdrain has become a grave problem, and traffic accidents resulting from depression of roads caused thereby has become a social problem. To avoid these, cavity inspectors or other means are used to detect a cavitation phenomenon at its early stage, so that cavities can be repaired in their nascent stages. These repairs are mainly carried out by an injection technique for injecting reinforcing materials into the cavities.

According to the injection technique, the reinforcing material is introduced into cavities in the ground surrounding the underdrain to increase soil density and close up water seepage paths, thereby preventing the progress of cavitation, or the reinforcing material is introduced into gaps in the junctions, etc., of the underdrain to prevent water seepage. The injection method includes packer, pressure circulation, Y-shaped pipe, and frame methods. In general, the packer method is often used.

According to the packer method designed for repairing pipes of small and median diameters (ϕ700 mm or less), connector pipes, subordinate pipes, etc., an injection packer is guided and positioned from within the pipe forming the underdrain to the place to be repaired through a TV camera, so that the reinforcing material can be used to fill in the place to be repaired by means of an injector and hardened there by homogeneous gelation.

A reinforcing material used so far for the injection technique is different from generally available reinforcing materials, and developed exclusively for sewers. The reinforcing materials exclusive for sewers are generally broken down into suspension and solution types.

The suspension type of reinforcing material comprises a main ingredient of cement milk which can be hardened by a hardening agent within a short period of time, and is now commercially available in the form of cement-cement, cement-silica, and cement systems.

The solution type of reinforcing material includes a urethane system capable of reacting with water and a system using a hardening agent, and is now commercially available in the form of urethane, polyethylene glycol, and methylolpropene systems.

A problem with the suspension type of reinforcing material is, however, that a fine particle form of cement of excellent permeability is used for the main ingredient cement, but much difficulty is involved in the selection of the hardening agent to be used in combination therewith, because the hardening agent varies in hardened properties with makers. Another problem is that upon hardened the material becomes firm but poor in elasticity. Upon drying, on the other hand, the material cracks and so has a risk of self-disintegration.

A problem with the solution type of reinforcing material is that it provides a hardened (gelled) product the properties of which vary with the type of the main ingredient polymer. Another problem is that the material is excellent in elasticity but is of low strength. In particular, some urethane reinforcing materials, because of being poor in alkali resistance and showing an insufficient adhesion to a concrete fume pipe, are likely to flow back once injected.

To select a proper reinforcing material from commercially available ones is of great importance in making repairs on a sewer system by the packer method because among the commercially available reinforcing materials there is one unsuitable for a particular application. Use of an improper reinforcing material may possibly result in a serious accident.

It is therefore strongly desired to develop a reinforcing material that can be used for most applications, is excellent in workability, and provides a hardened product having stable properties, and excellent elasticity, strength and durability.

An object of the present invention is to meet such demand add eliminate the above problems by the combined use of a suspension type of reinforcing material and a solution type of reinforcing material, thereby taking advantage of both materials in a synergistic manner. That is, by using cement and organic polymer systems in combination with an asphalt emulsion, it is possible to achieve a bituminous reinforcing material for grouting that is excellent in workability and provides a hardened product which is excellent in alkali resistance, suffers from no shrinkage upon dried, is firm, and is excellent in elasticity.

SUMMARY OF THE INVENTION

According to the present invention, the above object is achieved by the provision of a bituminous reinforcing material for grouting comprising a liquid A that is obtained by mixing together an asphalt emulsion, a hydraulic inorganic material, a reactive type of water-soluble resin, and water, and a liquid B that is obtained by mixing together an asphalt emulsion, a hydraulic inorganic material, a polymerization catalyst, and water.

BRIEF DESCRIPTION OF THE DRAWINGS

The reinforcing material for grouting according to the present invention will now be explained, by way of example but no by way of limitation, with reference to the accompanying drawings.

DETAILED EXPLANATION OF THE INVENTION

Figure 1:
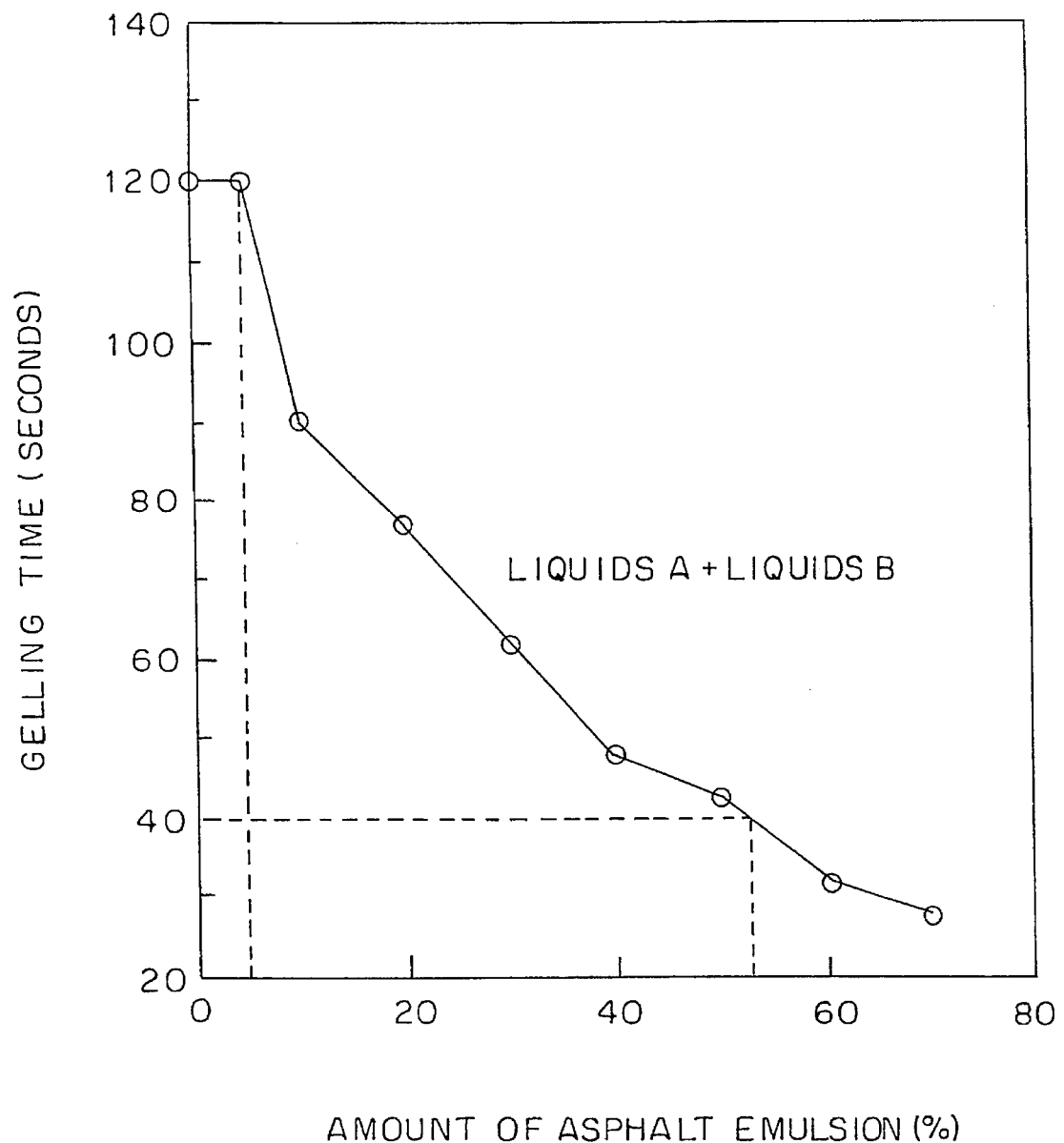
FIG. 1 is an amount of asphalt emulsion vs. gelling time graph.

According to the present invention, there is provided a bituminous reinforcing material comprising a liquid component A obtained by mixing together an asphalt emulsion, a hydraulic inorganic material, a reactive type of water-soluble resin and water, and a liquid component B obtained by mixing together an asphalt emulsion, a hydraulic inorganic material, a polymerization catalyst and water.

The present invention will now be explained at great length.

The asphalt emulsion is broken down into cationic, anionic and nonionic types depending on the type of the surface active agent used as an emulsifier. In the present invention, however, the asphalt emulsion to be used is limited to the cationic and nonionic types. The asphalt emulsion used herein also includes a modified asphalt emulsion.

For instance, the cationic or nonionic asphalt emulsion used herein includes an oil-in-water (O/W) type asphalt emulsion wherein at least one member selected from natural asphalt and petroleum asphalt such as straight asphalt, blown asphalt, semi-blown asphalt, and solvent-deasphalted asphalt (e.g., propane-deasphalted asphalt) is emulsified and dispersed together with additives such as emulsifiers, dispersants and stabilizers in water.

For the cationic and nonionic modified asphalt emulsions that are usable herein, it is preferable to use an O/W type of modified asphalt in which an asphalt material, obtained by the premix modification of at least one member selected from natural asphalt and petroleum asphalt such as straight asphalt, blown asphalt, semi-blown asphalt, and solvent-deasphalted asphalt (e.g., propane-deasphalted asphalt) by mixing therewith at least one member selected from rubber and a thermoplastic high-molecular polymer, is emulsified and dispersed together with additives such as emulsifiers, dispersants and stabilizers in water, and which can be well mixed with a hydraulic inorganic material. It is also preferable to use a modified asphalt emulsion obtained by the post-mix modification of an O/W type of asphalt emulsion by incorporating directly thereinto at least one member selected from rubber and a thermoplastic high-molecular polymer.

Examples of the rubber and thermoplastic high-molecular polymer used for the modified asphalt emulsion are natural rubber, gutta-percha, cyclized rubber, styrene, butadiene, styrene-isoprene rubber, isoprene rubber, polyisoprene rubber, butadiene rubber, chloroprene rubber, butyl rubber, halogenated butyl rubber, chlorinated polyethylene, chlorosulfonated polyethylene, ethylene-propylene rubber, EPT rubber, alfin rubber, styrene-butadiene block polymer rubber, and styrene-isoprene block polymer rubber; and ethylene-vinyl acetate copolymers, ethylene-acrylate copolymers, polyethylene, and vinyl acetate-acrylate copolymers. These may be used alone or in combination of two or more.

The rubber and thermoplastic high-molecular polymer may be used in various shapes and forms, for instance, in powder, granule, latex, emulsion, and aqueous forms. Among these, a latex, emulsion or aqueous form of rubber or thermoplastic high-molecular polymer is used for the modified asphalt emulsion obtained by the post-mix method. Of course, they may be used for the modified asphalt emulsion obtained by the pre-mix method.

Tackifier additives or thermoplastic solid resin rubber, liquid resin, softener, plasticizer, etc., together with the above rubber and thermoplastic high-molecular polymer, may be added to the modified asphalt emulsion to improve its adhesion and compatibility. Used to this end, for instance, are rosin and its derivative, terpene or petroleum resin or their derivative, alkyd resin, alkyl phenol resin, terpene phenol resin, cumarone-indene resin, synthetic terpene resin, alkylene resin, polyisobutylene, polybutadiene, polybutene, isobutylene-butadiene copolymer, mineral oil, process oil, pine oil, anthracene oil, plasticizer, animal and plant oil, and polymerized oil.

The modified asphalt emulsion may also contain additives such as anti-aging agent, anti-oxidizing agent, and sulfur. Furthermore for the purpose of viscosity controlling of modified asphalt emulsion, it may contain water-soluble high-molecular protecting colloids of MC, CMC, HEC, PVA, gelatin, etc.

The content of the rubber and thermoplastic high-molecular polymer in the modified asphalt emulsion is preferably about 2 to about 20% by weight, more preferably about 5 to about 10% by weight per 100% by weight of asphalt. For the asphalt contained in the modified asphalt emulsion, an asphalt having a rate of penetration of about 40 to about 300 as measured at 25° C. is preferably used in view of properties on decomposed and hardened.

An asphalt emulsion or modified asphalt emulsion has usually a solid concentration upon evaporated of about 30 to about 70% by weight. In the present invention, however, it is preferable that the solid concentration upon evaporation be 40 to 50% by weight.

The asphalt emulsion or modified asphalt emulsion is used in an amount of preferably about 4 to about 60% by weight, more preferably about 5 to about 50% by weight with respect to the reinforcing material with the liquid components A and B mixed together. When the amount of the asphalt emulsion used is less than 4% by weight, the reinforcing material shows a high post-drying shrinkage factor upon hardening, and so becomes poor in reinforcing function and durability. When the amount of the asphalt emulsion used is more than 60% by weight, on the other hand, the reinforcing material increases in viscosity, and so gels too rapidly, resulting in much difficulty in laying.

The hydraulic inorganic material used in the present invention includes cement, anhydrous gypsum, hemihydrate gypsum, and powdery blast furnace slug. The cement usable herein, for instance, includes normal portland cement, high early strength portland cement, moderate heat cement, white portland cement, blast furnace cement, silica cement, fly ash cement, alumna cement, expansive cement, sulfate resistive cement, jet cement, blast furnace colloid cement, colloid cement, and ultrafine cement for grout.

The amount of the hydraulic inorganic material used is usually about 6 to about 60% by weight, preferably about 18 to about 42% by weight relative to the reinforcing material with liquids A and B mixed together. When the amount of the hydraulic inorganic material used is less than 6% by weight, the reinforcing material decreases in strength upon hardening. When the amount of the hydraulic inorganic material used exceeds 60% by weight, on the other hand, the reinforcing material increases in viscosity, resulting in difficulty injection.

In one embodiment of the present invention, the bituminous reinforcing material for grouting comprises a liquid A obtained by mixing together from 2 to 30% by weight of an asphalt emulsion, 3 to 30% by weight of a hydraulic inorganic material, 4 to 15% by weight of a reactive water-soluble resin, and 4 to 40% by weight water. Liquid B is obtained by mixing together 2 to 30% by weight of an asphalt emulsion, 3 to 30% by weight of a hydraulic inorganic material, 1 to 6% by weight of a polymerization catalyst, and 4 to 40% by weight of water.

If necessary, the hydraulic inorganic material may be used in combination with additives known for cement such as shrinkage compensators, hardening promoters, hardening retarders, dispersants, air entrainers, thickeners, water reducers, and fillers.

Included in the reactive type of water-soluble resin used in the present invention, for instance, are polyethylene glycol methacrylate, polyethylene glycol dimethacrylate, N-methylolpropene, and methylenebispropene, which may be used alone or in combination of two or more.

The amount of the reactive type of water-soluble resin used is usually about 4 to about 15% by weight, preferably about 6 to about 9% by weight with respect to the liquid A. When the amount of the reactive type of water-soluble resin used is less than 4% by weight, it is impossible to regulate the gelling time of the reinforcing material. When the amount of the reactive type of water-soluble resin used exceeds 15% by weight, on the other hand, the reinforcing material shows an increased volumetric expansion and so fails to perform its own function.

The polymerization catalyst used in the present invention should preferably be soluble in water, and may be exemplified by persulfates of potassium, sodium and ammonium, peroxodisulfuric acid, peroxomonosulfuric acid, phosphoric acid, sulfuric acid, and hydrochloric acid.

The amount of the polymerization catalyst used is usually about 1 to about 6% by weight, preferably about 2 to about 3% by weight relative to the liquid B. When the amount of the polymerization catalyst used is less than 1.0% by weight, it is impossible to regulate the gelling time of the reinforcing material. When the amount of the polymerization catalyst used exceeds 6% by weight, on the other hand, the reinforcing material gels too rapidly, resulting in some considerable deterioration of its quality.

The amount of water used is usually about 4 to about 40% by weight relative to each of the liquids A and B, so that the reinforcing material can have a viscosity best suited for injection.

An account will now be given of one example of the (packer) method of injecting the bituminous reinforcing material according to the present invention.

To have a better understanding of what states sewers and the surrounding ground are in prior to reinforcement, a TV camera is first inserted through the underdrain, so that the inside of the underdrain can be monitored on the secreen of a television on the ground to find whether or not there is an underdrain failure. If the underdrain failure is found, hydraulic pressure testing is carried out by a packer to make examination of to what degree water seepage takes place. No increase in the hydraulic pressure indicates that the surrounding ground contains cavities.

After the inspection of where to reinforce, the injection conditions are then determined. That is, the injection pressure and the rate of injection of the liquids A and B are determined. Once advance preparations have been finished, the required materials are fed in mixers built in a two-component automatic pressure control plant, where they are stirred and mixed together to prepare liquids A and B. The thus prepared liquids A and B are fed into the packer at the predetermined speed by means of a constant rate pump. In the packer, the liquids A and B are mixed together to form a reinforcing material, which is in turn forced by the pressure of the pump into crevices in the failure of the underdrain, so that cavities, etc., can be filled up. The injection of the reinforcing material occurs through pressure control. Once the preset pressure has been reached, the injection of the reinforcing material is interrupted, and the injection of the reinforcing material is then resumed upon the pressure drop found. This process is repeated, and the injection of the reinforcing material is brought to an end at the time when no pressure drop is found. It is here to be noted that when the amount of the material injected increases with no pressure change found, the injection of the material is temporarily interrupted, and the injection of the material is resumed upon the solidification of the material found. After the completion of the injection of the material, the underdrain is washed out by a jet stream of water. In such a cycle, reinforcement is finished.

The bituminous reinforcing material for grouting according to the present invention is characterized in that, to facilitate control of reinforcing operation, the liquids A and B are blended together at a standard ratio of approximately 1:1.

A detailed account will now be given of examples of experimentation carried out for making determination of what reinforcing material is selected according to the present invention and examples of the present invention.

(1) To make determination of what reinforcing material is selected, experimentation was carried out by the packer method. At present no criteria for the injecting conditions for the packer method are available. In consideration of the results of the past reinforcing operations and the results of experiments, therefore, the target values for determining the reinforcing material to be used according to the present invention were comprehensively preset.

TABLE 1

Target values for reinforcing material

| | Physical Properties | Target Values | Remarks |
|---|---|---|---|
| Workability | Viscosity (cps) | max. 50 | Brookfield viscometer |
| | Gelling time (sec) | 40~120 | Cup method |
| Durability | Density (g/cc) | max. 2.0 | |
| | Strength after 28 days (kgf/cm$^2$) | 5~20 | Unconfined compression test |

Note 1) The viscosity is preferably selected from the range in which the reinforcing material can be injected at an invariable pressure without being affected by the gap.
Note 2) The gelling time is determined such that by the time the packer is removed, the reinforcing material is hardened to a hardness at which when the inside of the pipe is cleaned with a jet stream of water, the hardened product is preferably material is used fro the purpose of preventing water seepage, it is desired that the gelling time be as short as about 60 seconds.
Note 3) The density is preferably lower than that of soil, so that the reinforcing material can be wel compatible with soil. A density higher than that of soil may cuse recavitation.
Note 4) The reinforcing material, when it has too high a strength, is likely to disintegrate as by earthquake, and when it is of no strength, is poor in durability.

(2) In experiments for determining the reinforcing material to be used according to the present invention, materials shown in Table 2 were typically used on the basis of the results of preliminary tests.

TABLE 2

Material used for experimentation

| | Material | Physical properties | Properties | Remarks |
|---|---|---|---|---|
| 1 | Asphalt emulsion (nonionic type) | Appearance | Brown, Liquid | |
| | | Concentration % | 45 | |
| | | Viscosity (20° C.) cps | 20 | |
| 2 | Hydraulic inorganic material (ultrafine cement) | Appearance | Whitish-gray, Powder | |
| | | Specific gravity | 3.0 | |
| | | Fineness cm$^2$/g | 8000 | |
| 3 | Reactive type of water Soluble resin (N-methylolpropene) | Appearance | Colorless~Light brown, Transparent liquid | Main ingredient |
| | | Specific gravity | | |
| | | Viscosity (20 C.) cps | 6.2 | |
| | | PH (20° C.) | 4.5~5.5 | |
| 4 | Polymerization catalyst ammonium persulfate) | Appearance | White, Crystal powder | Hardening agent |
| | | True specific gravity | 1.98 | |

(3) Shown in Table 3 are testing standards and methods for determining the reinforcing material to be used according to the present invention.

TABLE 3

Item of test and procedure

| Item of test | Procedures | Condition |
|---|---|---|
| Brookfield Viscometer | JIS K 7117 | 20° C. |
| Cup testing test | Design and execution of the packing injection method | Room temperature |
| Density test | Design and execution of the packing injection method | 20° C. |
| Unconfined compression test | Provided by the Association of Soil Engineering | 20° C., material age of 7 and 28 days |

Note 1) Cup testing
Precisely metered constant amounts of liquids A and B proportioned for the desired composition were placed in beakers. Liquid A was transferred into the beaker with liquid B placed therein and, just thereafter, the mixture of liquids A and B was transferred into the emptied beaker. This cycle was rapidly repeated to find the point at which the mixture showed no fluidity, which is here defined as the gelling time (seconds).

TABLE 3-continued

Note 2) Unconfined compression testing
A specimen was prepared with a mold of φ50 mm × h100 mm. After removed from the mold, the specimen was cured at 20° C. until the material age for measurement was reached while it was put in a vinyl bag. The testing was done at a load speed of 1 mm/minute, and unconfined compressive strength and strain are found by Unconfined compressive strength (kgf/cm$^2$) = $\dfrac{\text{Max. load (kgf)}}{\text{Sectional area of specimen (cm}^2\text{)}}$ Strain (%) = $\dfrac{\text{Amount of deformation (cm)}}{\text{Height of specimen (cm)}} \times 100$

EXPERIMENT 1

This experiment was carried out (i) in varying amounts of the asphalt emulsion (including the amount of water added), (ii) in varying amounts of cement, and (iii) in varying amounts of the resin (the reactive type of water-soluble resin plus the polymerization catalyst) and water added). More illustratively, testing specimens proportioned as shown in Tables 4, 5 and 6 were selected in the light of the results of the preliminary tests carried out in advance.

To prepare test specimens, the required amounts of the water, reactive type of water-soluble resin, asphalt emulsion and cement were proportioned for the desired composition by beakers in the described order, and stirred for 2 minutes at 890 rpm using three-one motor made by Shinto Kagaku K.K., thereby preparing liquid A. To prepare liquid B, on the other hand, the required amounts of the water, polymerization catalyst, asphalt emulsion and cement were proportioned for the desired composition by beakers in the described order, and likewise stirred for 2 minutes. Immediately upon preparation, liquids A and B were measured for viscosity and density. Subsequently, liquids A and B were stirred and mixed together for 10 seconds to prepare a test specimen, which was then measured for viscosity, gelling time, and other factors.

The results are shown in Tables 4, 5 and 6. In the proportioned composition shown in Table 6, the proportion of the reactive type of water-soluble resin (main ingredient) to the polymerization catalyst (hardening agent) was kept constant at 2.9:1.

The results of the experiments were estimated while the target values shown in Table 1 were taken into consideration. In Table 7 satisfactory results are marked with circles and the less-than-satisfactory ones with crosses.

TABLE 4

| specimen No. | | 1 | 2 | 3 | 4 | 5 | 6 | 7 | 8 | 9 |
|---|---|---|---|---|---|---|---|---|---|---|
| Liquid A | | | | | | | | | | |
| Asphalt emulsion | | 0.0 | 2.7 | 5.4 | 10.8 | 16.2 | 21.6 | 27.0 | 32.4 | 37.8 |
| Ultrafine cemmt | | 11.5 | 11.5 | 11.5 | 11.5 | 11.5 | 11.5 | 11.5 | 11.5 | 11.5 |
| Main ingredient | | 7.0 | 7.0 | 7.0 | 7.0 | 7.0 | 7.0 | 7.0 | 7.0 | 7.0 |
| Water | | 28.2 | 26.1 | 24.4 | 20.3 | 16.1 | 11.9 | 7.8 | 3.6 | 0.0 |
| Liquid B | | | | | | | | | | |
| Asphalt emulsion | | 0.0 | 2.3 | 4.6 | 9.2 | 13.8 | 18.4 | 23.0 | 27.6 | 29.8 |
| Ultrafine cement | | 11.5 | 11.5 | 11.5 | 11.5 | 11.5 | 11.5 | 11.5 | 11.5 | 11.5 |
| Hardening agent | | 2.4 | 2.4 | 2.4 | 2.4 | 2.4 | 2.4 | 2.4 | 2.4 | 2.4 |
| Water | | 39.4 | 36.5 | 33.2 | 27.3 | 21.5 | 15.7 | 9.8 | 4.0 | 0.0 |
| Viscosity | Liquid A | 21.5 | 26.0 | 21.5 | 13.0 | 14.0 | 23.0 | 45.0 | 75.0 | 100.0 |
| (cps) | Liquid B | 17.5 | 15.5 | 24.0 | 26..5 | 43.0 | 49.0 | 182 | 1750 | 2150 |
| | Liquid A + Liquid B | 14.5 | 13.5 | 11.5 | 11.0 | 10.0 | 28.0 | 50.0 | *** | *** |
| Density | Liquid A | 1.21 | 1.19 | 1.21 | 1.21 | 1.20 | 1.20 | 1.22 | 1.18 | 1.16 |
| (gg/cc) | Liquid B | 1.19 | 1.20 | 1.21 | 1.21 | 1.22 | 1.20 | 1.20 | 1.23 | 1.21 |
| | Liquid A + Liquid B | 1.20 | 1.19 | 1.22 | 1.21 | 1.20 | 1.21 | 1.20 | 1.21 | 1.19 |
| Gelling time (sec) | | 120 | 120 | 90 | 77 | 62 | 48 | 43 | 32 | 28 |
| Unconfined compression test | | | | | | | | | | |
| Unconfined compressive strength (kgf/cm$^2$) | Material age 7 days | 3.9 | 3.9 | 7.9 | 8.6 | 10.3 | 13.0 | 11.8 | 12.8 | 10.3 |
| | Material age 28 days | 6.2 | 7.3 | 10.2 | 12.5 | 13.0 | 18.4 | 18.8 | 17.5 | 13.6 |
| | | 1.5 | 1.6 | 1.4 | 1.9 | 1.6 | 1.7 | 1.7 | 1.7 | 2.8 |
| Strain (%) | Material age 7 days | 2.3 | 1.9 | 1.3 | 1.6 | 1.7 | 1.0 | 1.3 | 1.5 | 1.7 |
| | Material age 28 days | 2.3 | 1.9 | 1.3 | 1.6 | 1.7 | 1.0 | 1.3 | 1.5 | 1.7 |

However, the amount of water also varied
***: No measurement due to too rapid gelling

TABLE 5

| | Varying amounts of cement | | | | | | | |
|---|---|---|---|---|---|---|---|---|
| specium No. | 10 | 11 | 12 | 13 | 14 | 15 | 16 | 17 |
| Liquid A | | | | | | | | |
| Asphalt emulsion | 15.0 | 15.0 | 15.0 | 15.0 | 15.0 | 15.0 | 15.0 | 15.0 |
| Ultrafine cement | 0 | 2.5 | 7.5 | 10.0 | 12.5 | 15.0 | 20.0 | 25.0 |
| Main ingredient | 7.0 | 7.0 | 7.0 | 7.0 | 7.0 | 7.0 | 7.0 | 7.0 |
| Water | 28.0 | 25.5 | 20.5 | 18.0 | 15.5 | 13.0 | 8.0 | 3.0 |
| Liquid B | | | | | | | | |
| Asphalt emulsion | 13.0 | 13.0 | 13.0 | 13.0 | 13.0 | 13.0 | 13.0 | 13.0 |
| Ultrafine cement | 0.0 | 2.5 | 7.5 | 10.0 | 12.5 | 15.0 | 20.0 | 25.0 |
| Hardening agent | 2.4 | 2.4 | 2.4 | 2.4 | 2.4 | 2.4 | 2.4 | 2.4 |

TABLE 5-continued

| | | Varying amounts of cement | | | | | | | |
|---|---|---|---|---|---|---|---|---|---|
| specium No. | | 10 | 11 | 12 | 13 | 14 | 15 | 16 | 17 |
| Water | | 34.6 | 32.1 | 27.1 | 24.6 | 22.1 | 19.6 | 14.6 | 9.6 |
| Vicosity (cps) | Liquid A | 5.5 | 7.0 | 8.0 | 10.5 | 17.5 | 28.5 | 80.0 | 435.0 |
| | Liquid B | 4.5 | 7.0 | 15.0 | 20.5 | 36.5 | 49.0 | 75.0 | 126.0 |
| | Liquid A + Liquid B | 6.0 | 6.5 | 10.0 | 11.0 | 13. 5 | 20.0 | 36.0 | 112.0 |
| Density (g/cc) | Liquid A | 1.02 | 1.06 | 1.14 | 1.18 | 1.21 | 1.24 | 1.30 | 1.35 |
| | Liquid B | 1.04 | 1.07 | 1.16 | 1.19 | 1.22 | 1.24 | 1.29 | 1.36 |
| | Liquid A + Liquid B | 1.03 | 1.05 | 1.14 | 1.17 | 1.21 | 1.25 | 1.30 | 1.36 |
| Gelling time (sec) | | 5400 | 72 | 77 | 87 | 82 | 86 | 97 | 100 |
| Unconfined compression test | | | | | | | | | |
| Unconfined compressive strength (kgf/cm$^2$) | Material age 7 days | **** | **** | **** | 9.4 | 8.9 | 8.2 | 10.4 | 16.7 |
| | Material age 28 days | **** | **** | 1.7 | 9.6 | 11.9 | 10.4 | 17.1 | 29.1 |
| Strain (%) | Material age 7 days | **** | **** | **** | 1.4 | 1.5 | 1.4 | 0.9 | 0.9 |
| | Material age 28 days | **** | **** | 7.3 | 1.5 | 1.3 | 1.5 | 0.8 | 1.1 |

However, the amount of water also varied
****: No measurement due to too rapid gelling

TABLE 6

| | | Varying amounts of resin | | | | | | | |
|---|---|---|---|---|---|---|---|---|---|
| specimen No. | | 18 | 19 | 20 | 21 | 22 | 23 | 24 | 25 |
| Liquid A | | | | | | | | | |
| Asphalt emulsion | | 15.0 | 15.0 | 15.0 | 15.0 | 15.0 | 15.0 | 15.0 | 15.0 |
| Ultrafine cement | | 11.5 | 11.5 | 11.5 | 11.5 | 11.5 | 11.5 | 11.5 | 11.5 |
| Main ingredient | | 0 | 2.2 | 4.5 | 6.7 | 8.9 | 11.2 | 13.4 | 15.6 |
| Water | | 23.5 | 21.3 | 19.0 | 16.8 | 14.6 | 12.3 | 10.1 | 7.9 |
| Liquid B | | | | | | | | | |
| Asphalt emulsion | | 13.0 | 13.0 | 13.0 | 13.0 | 13.0 | 13.0 | 13.0 | 13.0 |
| Ultrafine cement | | 11.5 | 11.5 | 11.5 | 11.5 | 11.5 | 11.5 | 11.5 | 11.5 |
| Hardening agent | | 0 | 0.8 | 1.5 | 2.3 | 3.1 | 3.8 | 4.6 | 5.4 |
| Water | | 25.5 | 24.7 | 24.0 | 23.2 | 22.4 | 21.7 | 20.9 | 20.1 |
| Viscosity (cps) | Liquid A | 33.5 | 19.5 | 17.0 | 15.5 | 13.5 | 16.0 | 25.5 | 21.5 |
| | Liquid B | 21.5 | 12.0 | 28.0 | 29.0 | 31.0 | 34.5 | 30.0 | 27.-5 |
| | Liquid A + Liquid B | 10.0 | 12.0 | 10.0 | 13.0 | 14.5 | 30.0 | - | - |
| Density (g/cc) | Liquid A | 1.216 | 1.182 | 1.188 | 1.197 | 1.205 | 1.209 | 1.210 | 1.220 |
| | Liquid B | 1.178 | 1.186 | 1.197 | 1.202 | 1.215 | 1.227 | 1.236 | 1.241 |
| | Liquid A + Liquid B | 1.192 | 1.184 | 1.189 | 1.198 | 1.207 | 1.210 | 1.220 | 1.221 |
| Gelling time (sec) | | No gelation | | 600< | 100 | 51 | 35 | 25 | 19 |
| Unconfined compression test | | | | | | | | | |
| Unconfined compressive strength (kgf/cm$^2$) | Material age 7 days | | | | | | | self-disintegration owing to volumetric expansion | |
| | Material age 28 days | | | 4.7 | 10.8 | 6.2 | | | |
| Strain (%) | Material age 7 days | | | | | 3.1 | 2.2 | 3.4 | |
| | Material age 28 days | | | 3.4 | 1.7 | 2.6 | | | |

Howver, the amount of water also varied

TABLE 7

Estimation of the results of experimentation

| Specimen | Estimation | Specimen | Estimation | Specimen | Estimation |
|---|---|---|---|---|---|
| 1 | x | 10 | x | 18 | x |
| 2 | o | 11 | x | 19 | x |
| 3 | o | 12 | x | 20 | o |
| 4 | o | 13 | o | 21 | o |
| 5 | o | 14 | o | 22 | o |
| 6 | o | 15 | o | 23 | x |
| 7 | o | 16 | o | 24 | x |
| 8 | x | 17 | x | 25 | x |
| 9 | x | | | | |

In summary, the results of the experiments indicate that all the testing specimens satisfy the target values in terms of density (g/cc). Moreover, all the testing specimens are found to satisfy the target values for unconfined compressive strength (28 days, kgf/cm$^2$), as can be seen from the results of use of varying amounts of asphalt emulsion; the target values for gelling time (second), as can be seen from the results of use of varying amounts of cement; and the target values for viscosity (cps), as can be seen from the results of use of varying amounts of resin.

Referring here to the results of the test specimens marked with crosses in Table 7, the following are found.

1) Test specimen No. 1 satisfies all the target values. From the results of preliminary testing (omitted), however, it is found that when it contains no asphalt emulsion, it shows an increased shrinkage upon drying and so is poor in the ability to prevent water seepage.

2) Test specimen Nos. 8 and 9 are poor in workability because liquid B and hence the mixed liquid hardens too rapidly due to its high viscosity.

3) Test specimen Nos. 10 and 11 could not be measured for unconfined compressive strength because the mixture of liquids A and B could not be harden; it did not removed from the mold. Test specimen No. 12 is too low in terms of strength and so poor in durability.

4) Test specimen No. 17 is too high in terms of viscosity and so poor in workability.

5) Test specimen Nos. 18 and 19 did not harden due to their insufficient gelation.

6) Test specimen Nos. 23, 24 and 25 harden too rapidly and so are poor in workability. It is found that too much resin results in an increased volume expansion, cracking and poor durability.

With these results of experimentation in mind, the preferable proportioning of the bituminous reinforcing material according to the present invention is considered.

Figure 2:
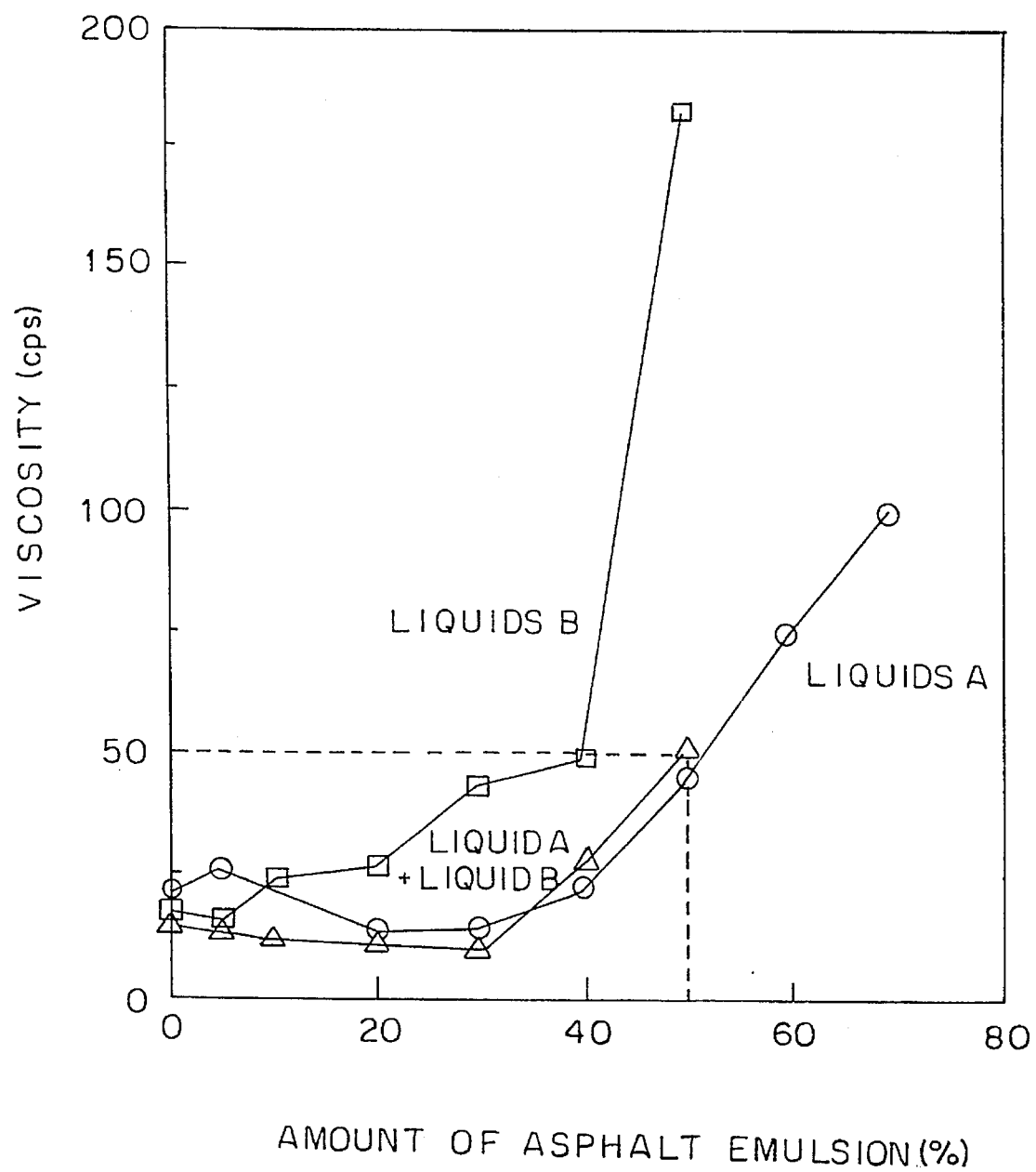
FIG. 2 is an amount of asphalt emulsion vs. viscosity graph.

FIG. 1 is a change in the amount of the asphalt emulsion in liquid A+B vs. gelling time change graph on which the results of experimentation shown in Table 4 are plotted, and FIG. 2 is a change in the amount of the asphalt emulsion in liquids A and B and A+B vs. viscosity change graph on which the results of experimentation shown in Table 4 are again plotted. From cross reference to FIGS. 1 and 2 and the target values for gelling time or viscosity shown in Table 1, it is found that the preferable range of the amount of the asphalt emulsion incorporated in the reinforcing material according to the present invention is 5 to 50% by weight of liquids A+B.

Figure 3:
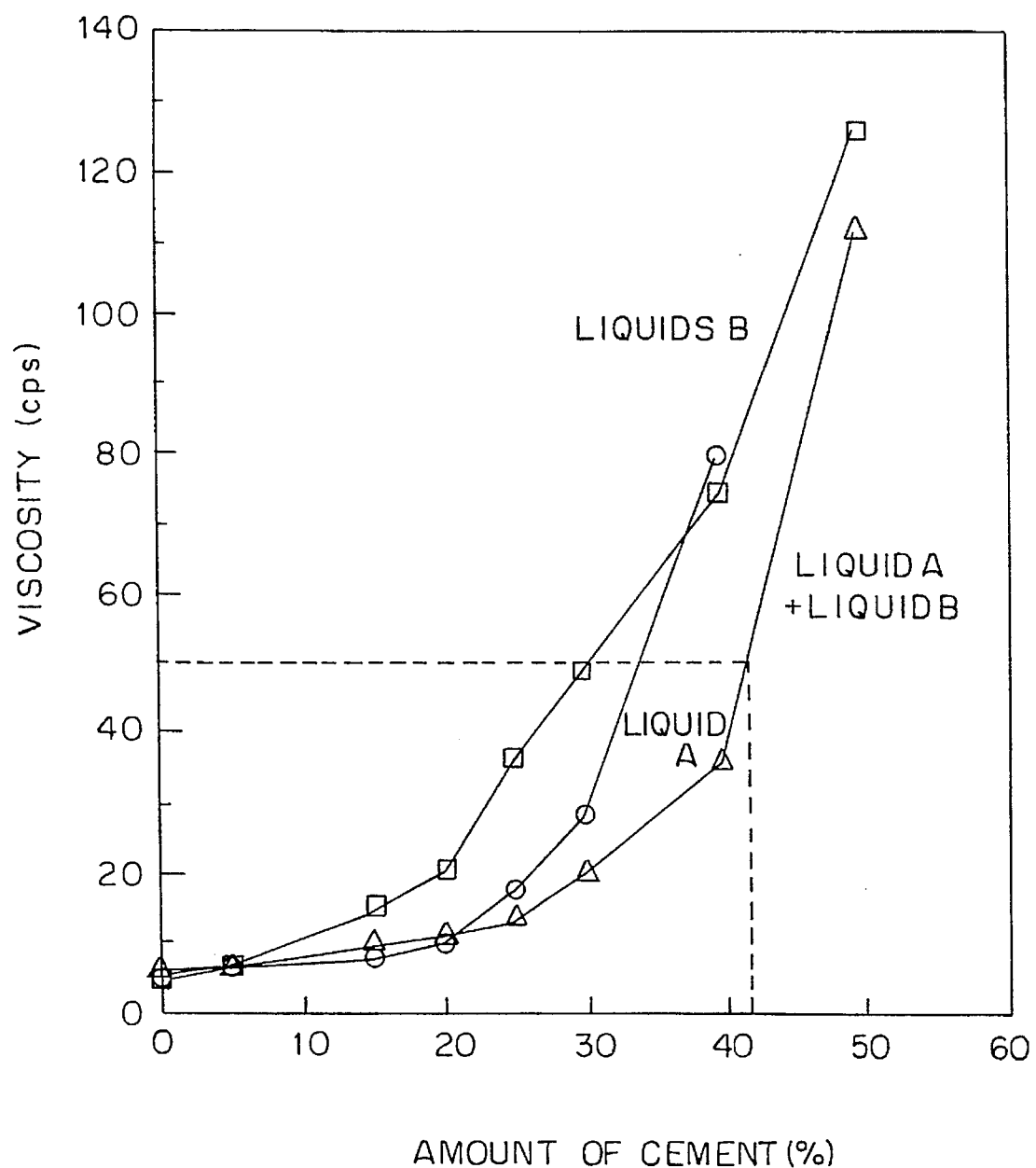
FIG. 3 is an amount of cement vs. viscosity graph.
Figure 4:
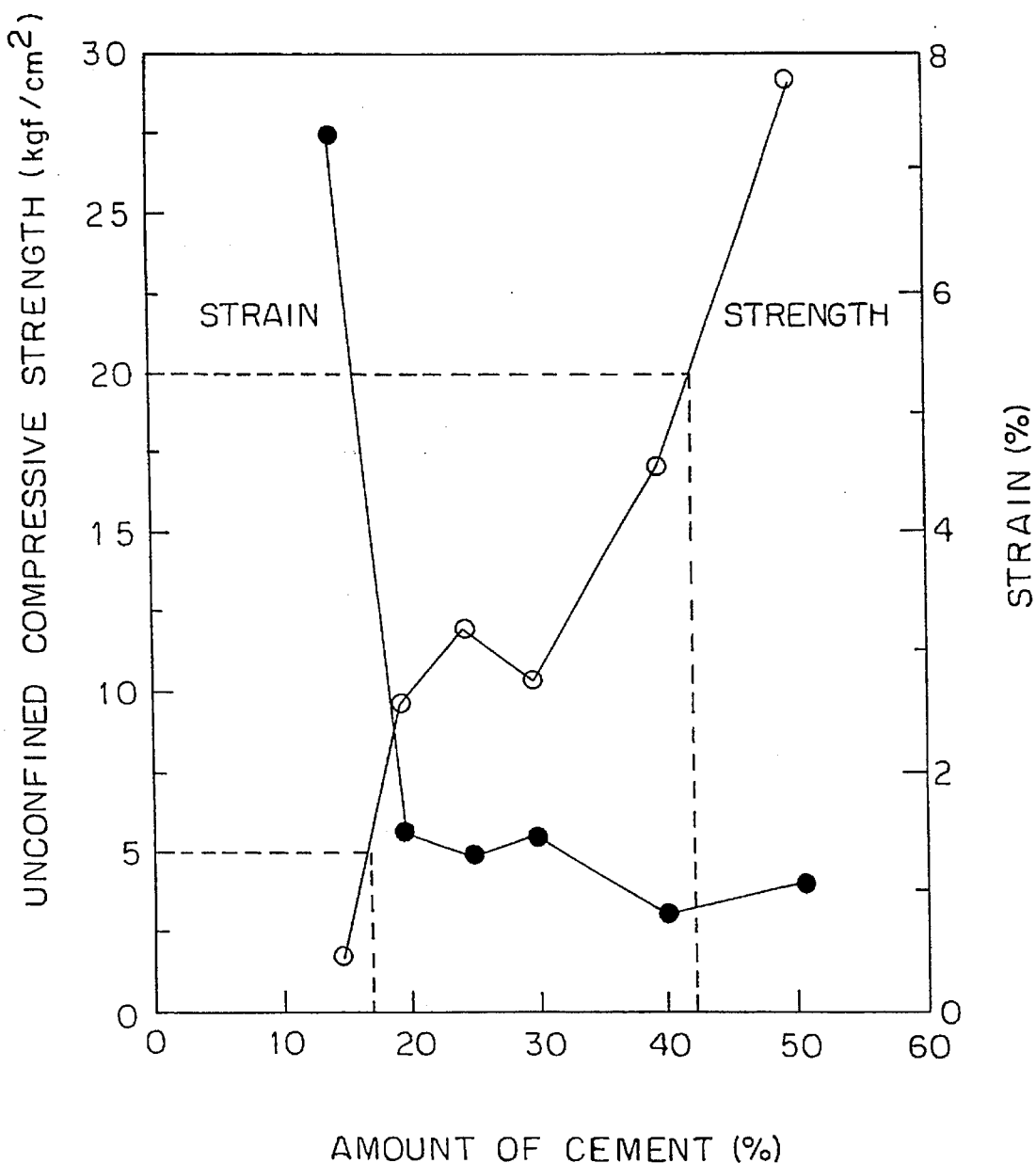
FIG. 4 is an amount of cement vs. unconfined compressive strength graph.

FIG. 3 is a graph on which the results of experimentation shown in Table 5 are plotted to illustrate the relationship between the change in the amount of cement in liquid A and B and liquids A+B and the concomitant viscosity change, and FIG. 4 is a graph for illustrating the relationship between the change in the amount of cement in liquids A+B and the change in the strength of material after the passage of 28 days. From cross reference to FIGS. 3 and 4 and the target values for viscosity or strength shown in Table 1, it is found that the preferable range of the amount of cement incorporated is 18 to 42% by weight of liquids A+B.

Figure 5:
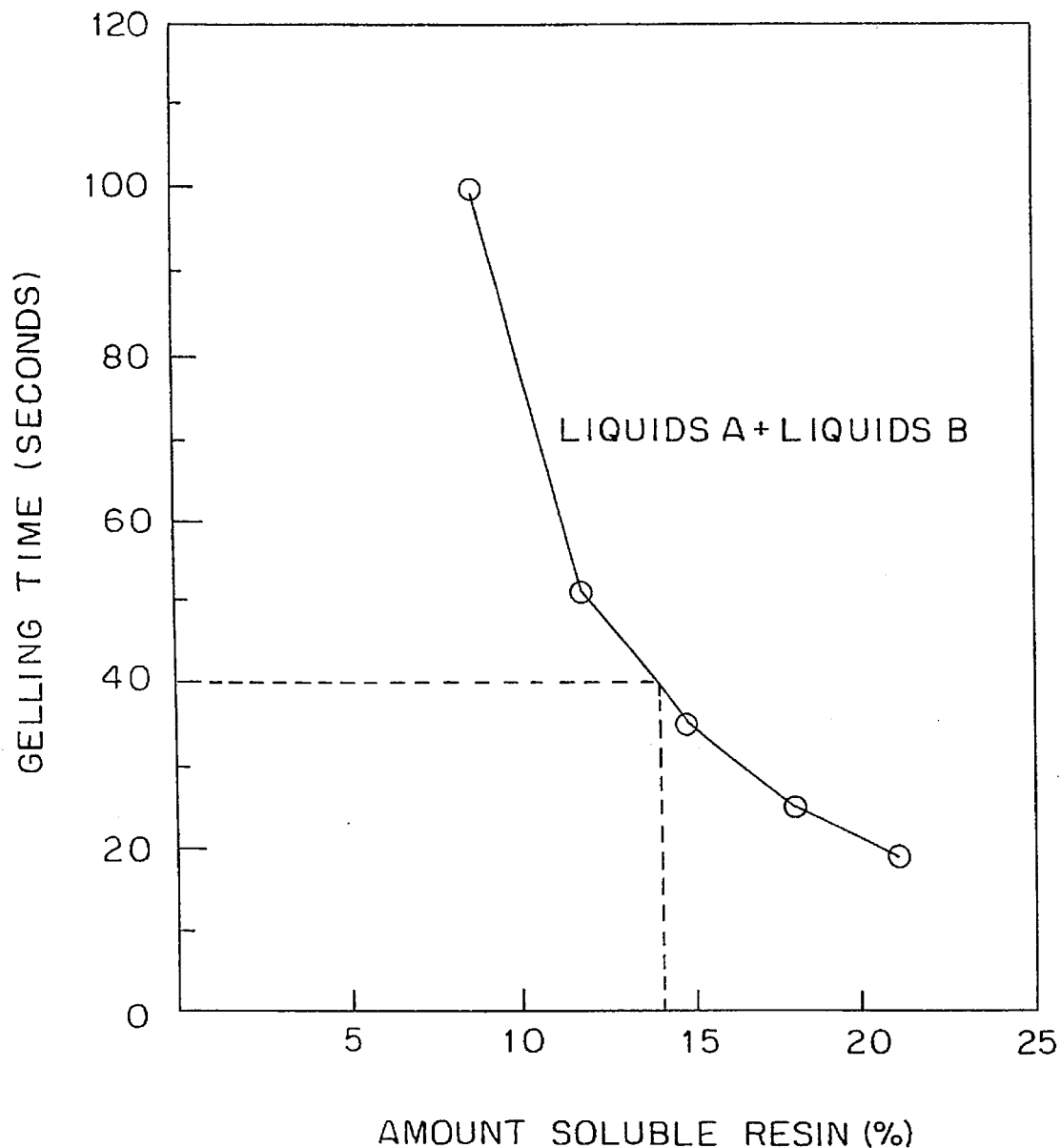
FIG. 5 is an amount of resin vs. gelling time graph.
Figure 6:
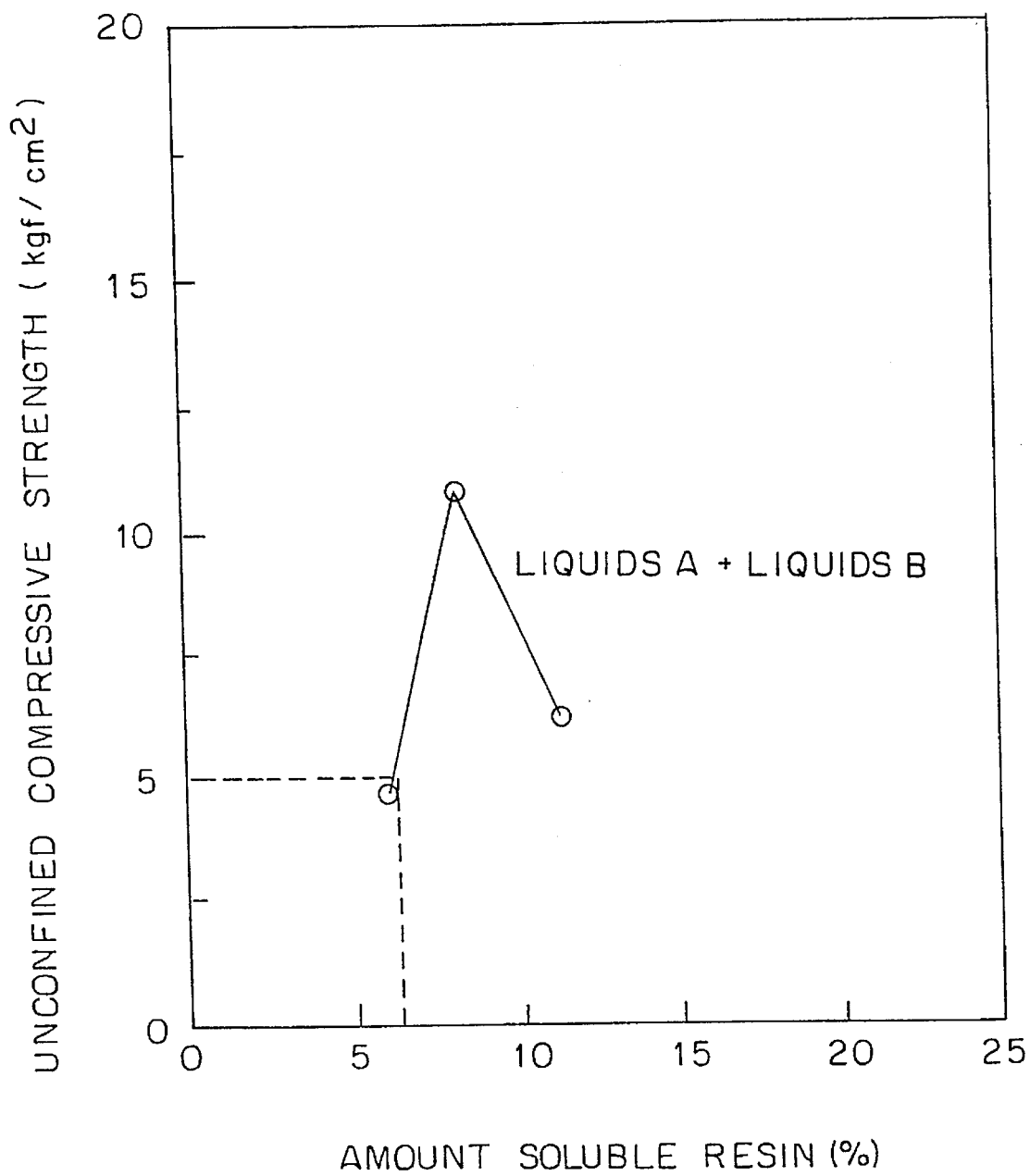
FIG. 6 is an amount of resin vs. unconfined compressive strength graph.

FIG. 5 is a graph on which the results of experimentation shown in Table 6 are plotted to illustrate the relationship between the change in the amount of resin in liquid A and B and liquids A+B and the concomitant gelling time change, and FIG. 6 is a graph for illustrating the relationship between the change in the amount of resin in liquids A+B and the change in the strength of material after the elapse of 28 days. From cross reference to FIGS. 5 and 6 and the target values for viscosity or strength shown in Table 1, it is found that the preferable range of the amount of cement incorporated is 9 to 12% by weight of liquids A+B.

It is here to be understood that the above preferable quantitative ranges are each one guide, and so vary depending on the type of the material used and the target values to be preset.

EXPERIMENT 2

To confirm whether or not the proper proportioning determined in Experiment 1 is practically usable, a standard material containing the modified asphalt emulsion as the asphalt emulsion was compared with a commercial one.

(1) Test Material and Proportioning

1) Test Materials

Main properties of the test materials are shown in Tables 8, 9, 10, 11 and 12.

TABLE 8

Properties of commercial product No. 1 (Cement - Silica system)

| Material | Physical properties | Properties |
|---|---|---|
| Ultrafine cement | Appearance | Whity-gray, Powder |
| | Specific gravity | 3.0 |
| | Fineness cm$^2$/g | 9000 |
| Silica | Appearance | Light milk white, Liquid |
| | Specfic gravity | 1.14 |
| | Viscosity (20° C.) cps | 5 or less |

TABLE 9

Properties of commercial product No. 2 (Cement-Cement system)

| Material | Physical properties | Properties |
|---|---|---|
| Blast furnace colloid cement | Appearance | Greenish gray, Powder |
| | Specfic gravity | 3.0 |
| | Fineness cm$^2$/g | 6100 |
| Alumina cement | Appearance | White, Powder |
| | Specfic gravity | 2.9 |
| | Fineness cm$^2$/g | 5500 |

TABLE 10

Properties of commerical product No. 3 (Polyethylene glycol system)

| Material | Physical properties | Properties |
|---|---|---|
| Polyethylene glycol | Appearance | Colorless, Liquid |
| | Specific gravity | 1.11 |
| | Viscosity (20 C.) cps | 48 |

TABLE 11

Properties of invention (Cement-Asphalt emulsion system)

| Material | Physical properties | Properties |
|---|---|---|
| Ultrafine cement | Appearance | Whity-gray, Powder |
| | Specfic gravity | 3.0 |
| | fineness $cm^2/g$ | 9000 |
| Asphalt emulsion | Appearance | Brown, Liquid |
| | Concentration | 45.0 |
| | Viscosity (20° C.) cps | 20.0 |

TABLE 12

Properties of commercial product No. 4 (Urethane system)

| Material | Physical properties | Properties |
|---|---|---|
| Urethane | Appearance | Colorless–light yellow, Liquid |
| | Specific gravity | 1.00 |
| | Viscosity (20° C.) cps | 150 |

2) Test Porportioning

The test materials were proportioned as shown in Tables 13, 14, 15, 16 and 17 to prepare reinforcing materials under test.

TABLE 13

Test proportion of commercial product No.1 (Cement-Silica system)

| | Material | Proportion wt % |
|---|---|---|
| Liquid A | Ultrafine cement | 20.75 |
| | Latex | 6.88 |
| | Dispersants | 0.20 |
| | Water | 27.53 |
| Liquid B | Silica | 20.75 |
| | Gelling time regulator | 1.05 |
| | Water | 22.84 |

TABLE 14

Test proportion of commercial product No.2 (Cement-Cement system)

| | Material | Proportion wt % |
|---|---|---|
| Liquid A | Blast furnace colloid cement | 31.6 |
| | Water | 47.3 |
| Liquid B | Alumina cement | 7.9 |
| | Water | 13.2 |
| | Retarder A wt % relative to alumina cement | 1.2 |
| | Retarder B wt % relative to alumina cement | 0.23 |

TABLE 15

Test proportion of commercial product No. 3 (Polyethylene glycol system)

| | Material | Proportion wt % |
|---|---|---|
| Liquid A | Main ingredient | 16.8 |
| | Promoter | 2.0 |
| | Water | 30.3 |
| Liquid B | Hardening agent | 1.0 |
| | Water | 49.9 |

TABLE 16

Test proportion of invention (Cement-Asphalt emulsion system)

| | Material | Proportion wt % |
|---|---|---|
| Liquid A | Asphalt emulsion | 18.0 |
| | Ultrafine cement | 11.5 |
| | Main ingredient | 7.0 |
| | Water | 13.5 |
| Liquid B | Asphalt emulsion | 18.0 |
| | Ultrafine cement | 11.5 |
| | Hardening agent | 2.4 |
| | Water | 18.1 |

TABLE 17

Test proportion of commercial product No.4 (Urethane system)

| | Material | Proportion wt % |
|---|---|---|
| A | Urethane | 20.0 |
| B | Water | 80.0 |

(2) What, and How is Tested

Reference will now be made to what and how was tested.

1) Cyclic Wetting and Drying Test

A sand gel specimen of $\phi 5 \times h10$ cm (sand:reinforcing material=2:1) was prepared. Then, the specimen was repeatedly subjected to air curing (drying) and water curing (wetting) every 24 hours to measure changes in the weight and volume of the specimen at an interval of 24 hours. Shape changes were also observed. Unconfined compressive testing was conducted at a material age of 20 days.

2) Water Permeability Test

A material was poured into a 3-mm gap centrally formed in a concrete block of $\phi 101.6 \times h52$ mm to prepare a specimen. Then, the specimen was tested at a material age of 28 days, a temperature of 20° C. and a hydraulic pressure of 1 $kgf/cm^2$.

3) Impact Strength Test

A sand gel specimen of $35 \times 30 \times 5$ cm (sand:reinforcing material=2:1) was prepared and then tested at a temperature of 20° C. In this test, a steel ball of known weight was impinged from a height of 1 m on the specimen by gravity and the number of impingements causing failure of the specimen was measured. Impact strength J was found by $J = m \times g \times h \times$ the number of where m=weight of the steel ball in g g=acceleration of gravity in $m/sec^2$ h=height in h.

4) Compression Shear Test

Two concrete slabs of 7×7×2 cm were placed upright 2-mm away from each other while they were displaced 10 mm from each other to prepare a specimen, into which material was then poured. The test was carried out at a material age of 28 days, a temperature of 20° C. and a loading speed of 1 mm/min.

$$\text{Compression shear strength} = \frac{\text{Max. load (kgf)}}{\text{Sectional area of specimen (cm}^2\text{)}}$$

It is here to be noted that the preparation of the specimen of each test material was made according to the mixing procedures stipulated for commercial and inventive materials.

(3) Results of the Tests

1) Cyclic Wetting and Drying Test

The results of the cyclic wetting and drying test are shown in Tables 18–20, with the volumetric changes set out in Table 18, the weight changes in Table 19, and the unconfined compressive strengths in Table 20.

TABLE 18

Results of cyclic wetting and drying test Volumetric change

| | | Material | | | | |
|---|---|---|---|---|---|---|
| | Cycle | Cement-Silica system | Cement-Cement system | Polyethylene glycol system | Cement-Asphalt emulsion system | Urethane system |
| 1 | After drying % | −0.3 | 0.1 | −1.7 | 0.7 | −19.0 |
|   | After wetting % | −0.4 | −0.2 | 0.8 | 0.6 | −16.1 |
| 2 | After drying % | −0.5 | 0.0 | 4.3 | 0.7 | −20.8 |
|   | After wetting % | −0.2 | −0.3 | −0.3 | 0.5 | −17.6 |
| 3 | After drying % | −0.4 | −0.2 | −1.5 | 0.3 | −21.1 |
|   | After wetting % | −0.4 | −0.4 | −0.9 | 0.0 | −17.7 |
| 4 | After drying % | −0.3 | −0.3 | −0.7 | 0.6 | −20.5 |
|   | After wetting % | −0.6 | −0.2 | 0.2 | 0.3 | −18.1 |
| 5 | After drying % | −0.7 | 0.0 | −2.3 | 0.5 | −21.3 |
|   | After wetting % | −0.6 | −0.1 | 0.4 | −0.2 | −18.2 |
| 6 | After drying % | −0.9 | −0.3 | −2.5 | −0.1 | −22.3 |
|   | After wetting % | −0.9 | −0.3 | −2.4 | 0.3 | −19.0 |
| 7 | After drying % | −1.3 | −0.7 | −5.8 | 0.0 | −22.7 |
|   | After wetting % | −0.8 | −0.2 | −3.8 | 0.1 | −19.6 |
| 8 | After drying % | −1.2 | −0.2 | −9.0 | 0.3 | −23.7 |
|   | After wetting % | −1.5 | −0.6 | −6.0 | 0.0 | −20.0 |
| 9 | After drying % | −2.2 | −0.6 | −6.8 | 0.0 | −23.8 |
|   | After wetting % | −1.6 | −0.3 | −7.9 | −0.1 | −20.9 |
| 10 | After drying % | −2.2 | −0.6 | −8.2 | 0.0 | −24.5 |
|   | After wetting % | −2.1 | 0.1 | −9.8 | 0.0 | −21.3 |

TABLE 19

Results of cyclic wetting and drying test Weight change

| | | Material | | | | |
|---|---|---|---|---|---|---|
| | Cycle | Cement-Silica system | Cement-Cement system | Polyethylene glycol system | Cement-Asphalt emulsion system | Urethane system |
| 1 | After drying % | −4.6 | −5.0 | −3.9 | −5.1 | −7.1 |
|   | After wetting % | −1.3 | 0.6 | 1.4 | −4.0 | −4.0 |
| 2 | After drying % | −4.4 | −3.0 | −3.3 | −6.7 | −8.4 |
|   | After wetting % | −1.8 | 0.6 | −1.3 | −5.2 | −5.2 |
| 3 | After drying % | −4.5 | −1.3 | −4.1 | −6.7 | −7.1 |
|   | After wetting % | −2.0 | 0.7 | −1.0 | −5.3 | −4.8 |
| 4 | After drying % | −5.0 | −6.2 | −3.4 | −6.5 | −7.5 |
|   | After wetting % | −2.4 | 0.6 | −1.6 | −5.5 | −4.9 |
| 5 | After drying % | −7.6 | −3.1 | −6.0 | −7.8 | −11.4 |
|   | After wetting % | −3.2 | 0.6 | −2.8 | −7.5 | −6.8 |
| 6 | After drying % | −9.0 | −5.5 | −8.4 | −9.5 | −12.3 |
|   | Alter wetting % | −3.8 | 0.6 | −4.0 | −7.9 | −7.7 |
| 7 | After drying % | −10.5 | −7.0 | −11.1 | −10.1 | −14.8 |
|   | After wetting % | −4.7 | 0.4 | −5.5 | −8.4 | −9.6 |
| 8 | After drying % | −11.7 | −7.0 | −12.2 | −10.5 | −16.2 |
|   | After wetting % | −5.4 | 0.3 | −7.3 | −8.8 | −11.1 |

TABLE 19-continued

Results of cyclic wetting and drying test Weight change

| | Material | | | | |
|---|---|---|---|---|---|
| Cycle | Cement-Silica system | Cement-Cement system | Polyethylene glycol system | Cement-Asphalt emulsion system | Urethane system |
| 9 After drying % | −13.2 | −7.5 | −14.6 | −10.9 | −18.1 |
| After wetting % | −5.9 | 0.2 | −8.8 | −9.1 | −12.2 |
| 10 After drying % | −12.0 | −6.1 | −14.6 | −11.0 | −18.2 |
| After wetting % | −6.3 | 0.2 | −11.8 | −9.3 | −12.5 |

TABLE 20

Results of cyclic wetting and drying test
Unconfined compressive strength

| | Physical properties | | | |
|---|---|---|---|---|
| | After the completion of 10 cycles | | Water carrying material age of 20 ays | |
| Material | Strength kgf/cm² | Strain % | Strength kgf/cm² | Strain % |
| Cement - Silica system | 23.9 | 1.4 | 17.4 | 1.0 |
| Cement - Cement system | 48.3 | 0.9 | 53.8 | 1.0 |
| Polyethylene glycol system | 0.4 | 8.1 | 0.2 | 4.7 |
| Cement - Asphalt emulsion system | 17.6 | 2.5 | 9.3 | 1.9 |
| Urethane system | 1.7 | min. 15 | 0.4 | min. 15 |

The urethane system showed the largest volumetric change and exhibited an about 20% shrinkage after one cycle of drying. This system then tended to shrink slowly while repeatedly subjected to shrinkage due to drying and expansion due to wetting.

The polyethylene glycol system started to shrink slowly after six cycles of drying, and tended to start becoming small due to surface losses. After the completion of ten cycles, the system showed an about 10% shrinkage in volume.

The cement-cement and cement-asphalt emulsion systems showed no substantial volumetric change.

The cement-silica system showed an about 2% shrinkage in volume due to surface losses after the completion of ten cycles.

Referring now to the weight changes, all the materials tended to decrease in weight due to drying and increase in weight due to wetting. However, the cement-asphalt emulsion system was considered to be a material having low water absorption properties because its weight change was found to be within about 2% in sharp contrast to the at least 5% weight changes other specimens showed. After the completion of ten cycles, the cement-cement system showed almost 0% weight change again in sharp contrast to the about 10% weight changes other systems showed.

Referring then to the unconfined compressive strength, data obtained after repeated drying were larger than those obtained 20 days after water curing except for the cement-cement system. The cement-cement system showed no appreciable strength drop.

2) Results of the Water Permeability Test

The results of the water permeability test are shown in Table 21. Water permeation was observed in the case of the polyethylene glycol and urethane systems. In the polyethylene glycol system, failure of the material within the gap was found. In the urethane system, the material was dissolved in the water within the gap, because of its poor alkali resistance.

TABLE 21

Results of water permeability test

| Material | Coefficient of water permeation cm/sec |
|---|---|
| Cement- Silica system | No water permeation |
| Cement- Cement system | No water permeation |
| Polyethylene glycol system | $9.93 \times 10^{-4}$ |
| Cement- Asphalt emulsion system | No water permeation |
| Urethane system | $1.28 \times 10^{-5}$ |

3) Results of the Impact Strength Test

The results of the impact strength test are shown in Table 22. In all the materials, the impact strength was higher in sand gel than in homogeneous gel.

The impact strength test is to determine whether or not a material is elastic. The larger the strength value, the better the elasticity. As can be seen from the results, the system according to the present invention (cement-asphalt emulsion system) has the largest strength value and indicates that it is excellent in elasticity and the ability to follow deformation.

TABLE 22

Results of impact strength

| | Impact strength J | |
|---|---|---|
| Material | Homogeneous gel | Sand gel |
| Cement- Silica system | 5.2 | 42.6 |
| Cement- Cement system | 52.5 | 1114.4 |
| Polyethylene glycol system | 5.2 | 65.1 |
| Cement- Asphalt emulsion system | 252.9 | 1375.0 |
| Urethane system | 62.6 | 94.4 |

4) Results of the Compression Shear Test

The results of the compression shear test are shown in Table 23.

TABLE 23

Results of compression shear test material age

| Material | | | 3 hours | 1 day | 7 days | 28 days |
|---|---|---|---|---|---|---|
| | | | | Material age | | |
| Cement- Silica system | Strength | kgf/cm² | — | — | — | 0.18 |
| | Strain | % | — | — | — | 0.10 |
| Cement- Cement system | Strength | kgf/cm² | 0.32 | 0.42 | 1.49 | 4.38 |
| | Strain | % | 0.15 | 0.11 | 0.27 | 0.55 |
| Polyethylene glycol system | Strength | kgf/cm² | 0.04 | 0.02 | 0.02 | — |
| | Strain | % | 1.33 | 0.48 | 0.77 | — |
| Cement- Asphalt | Strength | kgf/cm² | — | 0.92 | 4.74 | 6.15 |
| emulsion system | Strain | % | — | 0.42 | 0.75 | 0.76 |
| Urethane system | Strength | kgf/cm² | 0.46 | 0.24 | 0.17 | 0.04 |
| | Strain | % | 4.05 | 2.99 | 2.93 | 3.40 |

The adhesive strength of the cement-asphalt emulsion system tended to increase with time, and was 6.15 kgf/cm² at a material age of 28 days. Strain, too, tended to increase with time, and was 0.76% at a material age of 28 days.

The adhesive strength of the cement-cement system tends to increase with time, and was 4.33 kgf/cm² at a material age of 28 days. Strain, too, tended to increase with time, and was 0.55% at a material age of 28 days.

The adhesive strength of the cement-silica system could not be measured at a material age of 7 days because of insufficient strength, and was 0.18 kgf/cm² at a material age of 28 days. Strain was 0.10% at a material age of 28 days.

The adhesive strength of the urethane system tended to decrease with time, and was 0.04 kgf/cm² at a material age of 28 days. Strain was 3.40% at a material age of 28 days.

The adhesive strength of the polyethylene glycol system tended to decrease with time, and could not be measured at a material age of 28 days.

From the above results of the tests, it is found that the inventive (cement-asphalt emulsion) system is a material that suffers from no volumetric change in use, and is lower than those of commercial origin in terms of weight change and water absorption.

It is also found that the specimen of the present invention is improved over those of commercial origin in terms of alkali resistance, elasticity, the ability to be bonded to concrete fume pipes and the ability to prevent water seepage as well as in terms of durability. It is thus found that the present invention provides a novel reinforcing material for grouting that can be well used with the packer or other injection methods.

EXAMPLE 1

The bituminous reinforcing material for grouting obtained according to the present invention and selected as explained in Experiments 1 and 2 was in situ used to make tentative repairs upon a sewer by the packer method, whereby its applicability was examined. In the tentative method, TV camera inspection and hydraulic pressure testing were first carried out determine where to repair. Then, the packer method was executed. Finally, TV camera inspection, hydraulic pressure testing and cut-and-cover inspection were carried out to confirm the repairing effect. Where to repair was the ground through which a concrete fume pipe of ϕ250 mm was passed with an average soil covering of about 2 m.

(1) Preliminary Inspection

A television camera was inserted through the underdrain to display on the screen of a monitor television on the ground the states of pipe failure, pipe cracks, water seepage, joints, connectors, etc., and continuously record them on a video tape, and photographs were taken of the places to be repaired. Then, hydraulic pressure testing was carried out to make inspection of to what degress water seepage took place in the failed places. This testing was carried out at a preset pressure of 0.7 kgf/cm² and a water injection rate of 1.5 liters/min.

(2) Packer Method

The packer method was executed on the place to be repaired or reinforced. In that place in question, the pipe was found to crack over a width of at least 5 mm.

While the place to be repaired was monitored on the screen of the television through the TV camera, the packer was set in the place to be repaired, and the materials were mixed together and pumped into that place using a two-liquid injection plant vehicle. The injection of the reinforcing material was carried out at a preset pressure of 1.5 kgf/cm², a design injection rate of 90 liters, and injection rates of 2 liters/minute for liquid A and 2 liters/minute for liquid B, while pressure control was carried out. The injection of the reinforcing material was temporarily interrupted upon the preset pressure reached, and resumed upon a given pressure drop found. This process was repeated, and the injection of the reinforcing material was brought to an end at the time when no pressure drop was found. In this process, the reinforcing material was successfully injected into the place at a pressure of about 0.7 kgf/cm² due to the crack being wide. However, since there was a possibility sufficient, the injection of the reinforcing material was temporarily interrupted when the amount of the reinforcing material injected reached 33 liters. At this time, the pressure dropped to 0 kgf/cm². After the elapse of about 3 minutes, the injection of the reinforcing material was resumed, and temporarily interrupted upon the amount of the reinforcing material injected reached about 50 liters. At this time, the pressure dropped to about 0.3 kgf/cm². After a period of about 5 minutes, the injection of the reinforcing material was again resumed, and was interrupted after. of 6 minutes or upon the pressure reduced to 0.6 kgf/cm2. The pressure was kept constant when the amount of the reinforcing material injected reached about 65 liters, and so the injection of the reinforcing material was stopped.

Shown in Table 24 are the results of quality control testing of the bituminous reinforcing material during the execution of the packer method.

TABLE 24

| | Material | Proportion % | Liquid Temperature °C. | | Viscosity cps | | Gelling time sec |
|---|---|---|---|---|---|---|---|
| Liquid A | Asphalt emulsion | 18.0 | 21.0 | 23.0 | 13.5 | 13.0 | 205 |
| | Ultrafine cement | 11.5 | | | | | |
| | Main ingredient | 7.0 | | | | | |
| | water | 13.5 | | | | | |
| Liquid B | Asphalt emulsion | 18.0 | 21.0 | | 16.0 | | |
| | Ultrafine cement | 11.5 | | | | | |
| | Hardening agent | 1.2 | | | | | |
| | Water | 19.3 | | | | | |

Note: In view of the situation of the site to be repaired, the gelling time was made longer than the target value for material selecting. Thus, the amount of the hardening agent used was reduced, correspondingly.

(3) Confirmation of the Repairing Effect

TV camera inspection indicated that the crack in the pipe was well filled up with the reinforcing material, and hydraulic pressure testing showed that there was no hydraulic pressure drop. About one month after the injection of the reinforcing material, cut-and-cover inspection was carried out. The ground in the vicinity of the site was made up of clayey soil, and the bituminous reinforcing material was injected along soil interfaces with no penetration of the material into the ground. In the site there was no cavity in the ground.

The above results teach that the bituminous reinforcing material for grouting according to the present invention is well applicable to practical in situ repairs in view of workability and the ability to prevent water seepage. It is also found that when the reinforcing material of the present invention is applied to the ground made up of clayey soil, it is injected through the ground in the arterial form. Although the outer portion of the pipe is not covered with the reinforcing material, the ability to prevent water seepage can be well ensured if the crack in the pipe is filled up therewith.

BENEFITS OF THE INVENTION

A brief account will now be given of the features and benefits of the bituminous reinforcing material for grouting according to the present invention.

(1) Since the asphalt emulsion is used as a bituminous system, the bituminous reinforcing material for grouting of the present invention is stable upon hardening; its volumetric and weight changes are small in use. In addition, the reinforcing material is reduced in terms of the so-called shrinkage upon dried and very excellent in the ability to prevent water seepage as well.

(2) In the bituminous reinforcing material for grouting of the present invention, the cement system is designee to be used in combination with the organic polymer system, so that high strength and excellent elasticity, both not found in conventional materials, can be imparted thereto. Thus, when filled in a cavity or the like and hardened, the reinforcing material follows well deformation and, in addition to this, shows some expansion until it is hardened, so that it can be very compatible with the surrounding ground when injected in place. Moreover, the reinforcing material is excellent in durability.

(3) The bituminous reinforcing material for grouting of the present invention, because of being excellent in alkali resistance, is unlikely to dissolve by contact with a concrete fume pipe, and shows good-enough adhesion to a concrete fume pipe.

(4) The bituminous reinforcing material for grouting of the present invention, because of being designed such that the mixing of liquids A and B occurs at approximately 1:1, is easy to execute and control, and is excellent in permeability and workability as well.

The bituminous reinforcing material for grouting of the present invention, as constructed above, has improved benefits. Thus, the bituminous reinforcing material of the present invention is not only applicable as fillers for cavities or the like in the ground surrounding underdrains through which sewers are laid down but also useful as backing materials for tunnels and for repairing pavements as well.

What is claimed is:

1. A bituminous reinforcing material produced by mixing together liquid A and liquid B;

wherein liquid A comprises a mixture of an asphalt emulsion, a hydraulic inorganic material, a reactive water-soluble resin, and water;

wherein liquid B comprises a mixture of an asphalt emulsion, a hydraulic inorganic material, a polymerization catalyst, and water;

wherein the total amount of asphalt emulsion in the bituminous reinforcing material ranges from about 4 to about 60% by weight;

the total amount of hydraulic inorganic material in the bituminous reinforcing material ranges from about 6 to about 60% by weight;

the total amount of reactive water soluble resin in the bituminous reinforcing material ranges from about 4 to about 15% by weight;

the amount of polymerization catalyst in the bituminous reinforcing material ranges from about 1 to about 6% by weight; and the amount of water in each of liquid A and liquid B is from about 4 to 40% by weight.

2. The bituminous reinforcing material according to claim 1 wherein the reactive water soluble resin is selected from the group consisting of polyethylene glycol methacrylate, polyethylene glycol dimethacrylate, N-methylolpropene, methylenebispropene, and mixtures thereof.

3. The bituminous reinforcing material according to claim 1 wherein liquid A comprises a mixture of from 2 to 30% by weight of an asphalt emulsion, from 3 to 30% by weight of a hydraulic inorganic material, from 4 to 15% by weight of a reactive water soluble resin, and from 4 to 40% by weight of water, and wherein liquid B comprises a mixture of from 2 to 30% by weight of an asphalt emulsion, from 3 to 30% by weight of a hydraulic inorganic material, from 1 to 6% by weight of a polymerization catalyst, and from 4 to 40% by weight of water.

4. The bituminous reinforcing material according to claim 1 wherein said asphalt emulsion in liquid A and said asphalt emulsion in liquid B are each selected from the group consisting of cationic asphalt emulsions, nonionic asphalt emulsions, and modified asphalt emulsions.

5. The bituminous reinforcing material according to claim 4 wherein said asphalt emulsion further includes an additive selected from the group consisting of rubber and thermoplastic high molecular weight polymers selected from the group consisting of natural rubber, gutta-percha, cyclized rubber, styrene-butadiene rubber, styrene-isoprene rubber, isoprene rubber, polyisoprene rubber, butadiene rubber, chloroprene rubber, butyl rubber, halogenated butyl rubber, chlorinated polyethylene, chlorosulfonated polyethylene, ethylene-propylene rubber, EPDM rubber, alfin rubber, styrene-butadiene block polymer rubber, styrene-isoprene block polymer rubber, ethylene-vinyl acetate copolymers, ethylene-acrylate copolymers, polyethylene, vinyl acetate-acrylate copolymers, and mixtures thereof.

6. The bituminous reinforcing material according to claim 5 wherein said asphalt emulsion further includes a tackifier additive selected from the group consisting of rosins, terpene resins, petroleum resins, terpene phenol resins, cumarone-indene resins, synthetic terpene resins, alkylene resins, polyisobutylene, polybutadiene, polybutene, isobutylene-butadiene copolymers, mineral oil, process oil, pine oil, anthracene oil, plasticizers, animal oils, plant oils, and polymerized oils.

7. The bituminous reinforcing material according to claim 1 wherein said hydraulic inorganic material in liquid A and said hydraulic inorganic material in liquid B are each selected from the group consisting of cement, anhydrous gypsum, hemihydrate gypsum, and powdery blast furnace slag.

8. The bituminous reinforcing material according to claim 1 wherein said polymerization catalyst is a water-soluble polymerization catalyst.

9. The bituminous reinforcing material according to claim 8 wherein said water-soluble polymerization catalyst is selected from the group consisting of sodium persulfate, potassium persulfate, ammonium persulfate, peroxodisulfuric acid, peroxomonosulfuric acid, sulfuric acid, and hydrochloric acid.

* * * * *